(12) United States Patent
Tazaki

(10) Patent No.: US 8,175,027 B2
(45) Date of Patent: May 8, 2012

(54) COMMUNICATION METHOD AND GATEWAY APPARATUS

(75) Inventor: Yuji Tazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 12/482,580

(22) Filed: Jun. 11, 2009

(65) Prior Publication Data
US 2010/0020748 A1    Jan. 28, 2010

(30) Foreign Application Priority Data
Jul. 23, 2008    (JP) .................................. 2008-189833

(51) Int. Cl.
H04B 7/216    (2006.01)
(52) U.S. Cl. ...................................................... 370/320
(58) Field of Classification Search .......... 370/310–350; 455/73–90.3
See application file for complete search history.

(56) References Cited

U.S. PATENT DOCUMENTS

| | | | |
|---|---|---|---|
| 2002/0083191 A1 | 6/2002 | Ryuutou et al. | |
| 2006/0285525 A1* | 12/2006 | Sastry .......................... | 370/338 |
| 2007/0053352 A1* | 3/2007 | Corcoran ...................... | 370/389 |
| 2008/0107070 A1* | 5/2008 | Sastry ........................... | 370/329 |
| 2008/0159125 A1* | 7/2008 | Ando et al. ................... | 370/221 |
| 2009/0080387 A1* | 3/2009 | Dell'Uomo et al. .......... | 370/338 |

FOREIGN PATENT DOCUMENTS

| | | |
|---|---|---|
| JP | 2002-190821 | 7/2002 |
| JP | 2006-67091 | 3/2006 |
| KR | 10-2005-0016587 | 2/2005 |
| WO | 2004/002032 | 12/2003 |

OTHER PUBLICATIONS

Korean Notice of Preliminary Rejection dated Jan. 20, 2011, from corresponding Korean Application No. 10-2009-62088.
WiMAX Forum Network Architecture, Release 1, Version 1.3.0, Nov. 2, 2008.

* cited by examiner

*Primary Examiner* — Chi Pham
*Assistant Examiner* — Fan Ng
(74) *Attorney, Agent, or Firm* — Katten Muchin Rosenman LLP

(57) ABSTRACT

A communication method in a gateway apparatus includes a transmission step of transmitting and receiving packets to and from a mobile station device, and transmitting and receiving packets to and from a home agent; and a setting step of establishing settings such that the packets from the mobile station device can be transmitted to at least a first and a second home agent, and the packets from at least the first and second home agents can be received.

11 Claims, 15 Drawing Sheets

FIG.3

| CONNECTION HA | DIRECTION | TRANSMISSION SOURCE | TRANSMISSION DESTINATION | DSCP | Protocol | Port |
|---|---|---|---|---|---|---|
| Visited HA 10.10.10.102 | Downlink | Do not care | 10.10.10.111 | 010010 | Do not care | Do not care |
| | Uplink | 10.10.10.111 | Do not care | 010010 | Do not care | Do not care |
| Home HA 11.10.10.12 | Downlink | Do not care | 11.10.10.15 | Not 010010 | Do not care | Do not care |
| | Uplink | 11.10.10.15 | Do not care | Not 010010 | Do not care | Do not care |

| CONNECTION HA | DIRECTION | TRANSMISSION SOURCE | TRANSMISSION DESTINATION | DSCP | Protocol | Port |
|---|---|---|---|---|---|---|
| Visited HA 10.10.10.102 | Downlink | Do not care | 10.10.10.111 | 010010 | Do not care | Do not care |
| | Uplink | 10.10.10.111 | Do not care | 010010 | Do not care | Do not care |
| Home HA 11.10.10.12 | Downlink | Do not care | 11.10.10.15 | Not 010010 | Do not care | Do not care |
| | Uplink | Do not care | Do not care | Not 010010 | Do not care | Do not care |

312

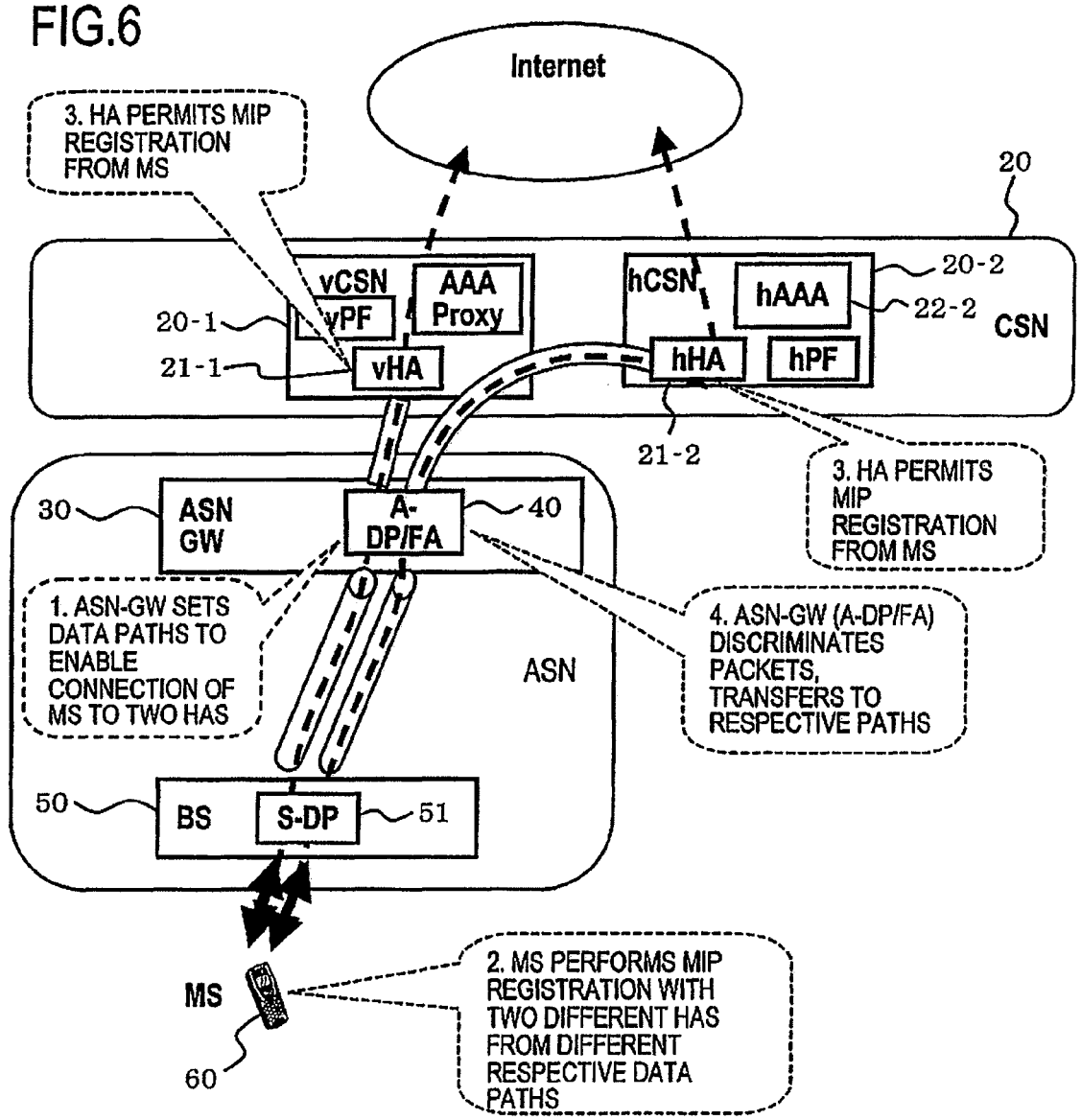

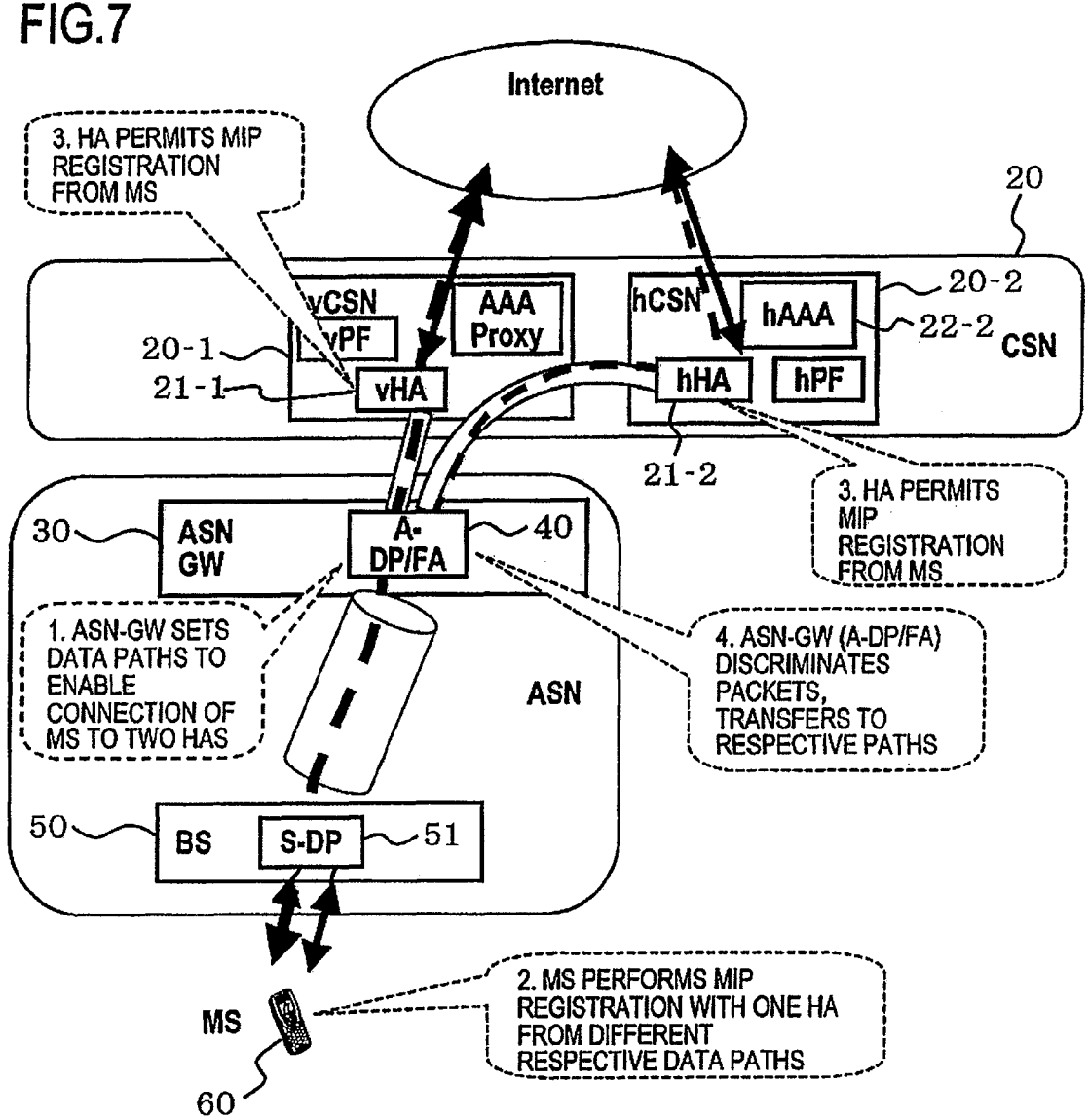

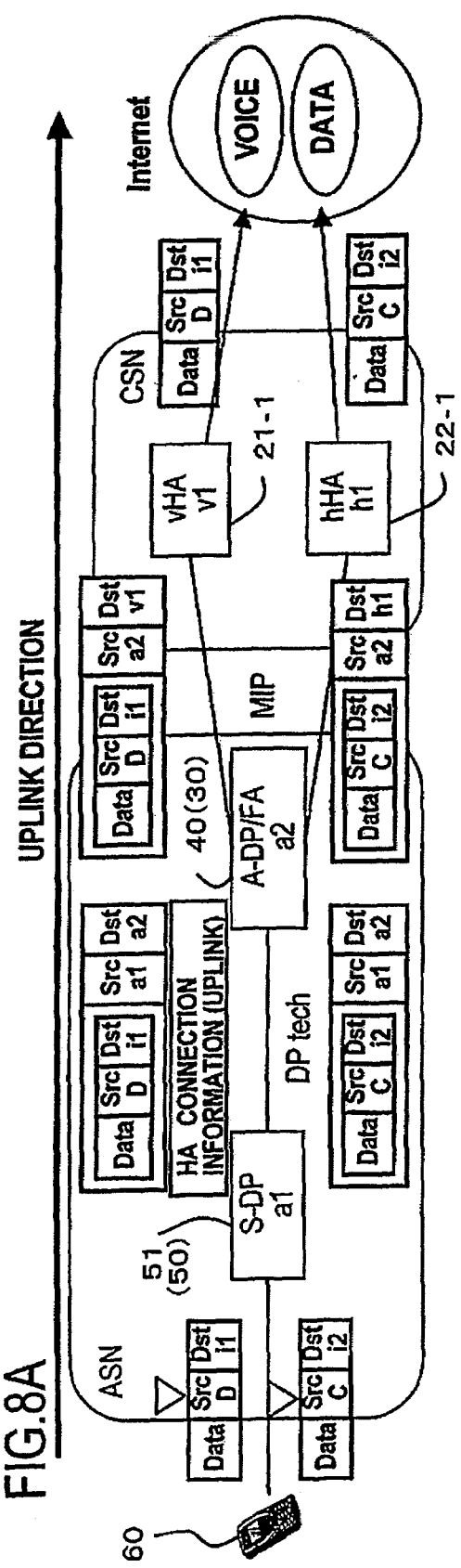
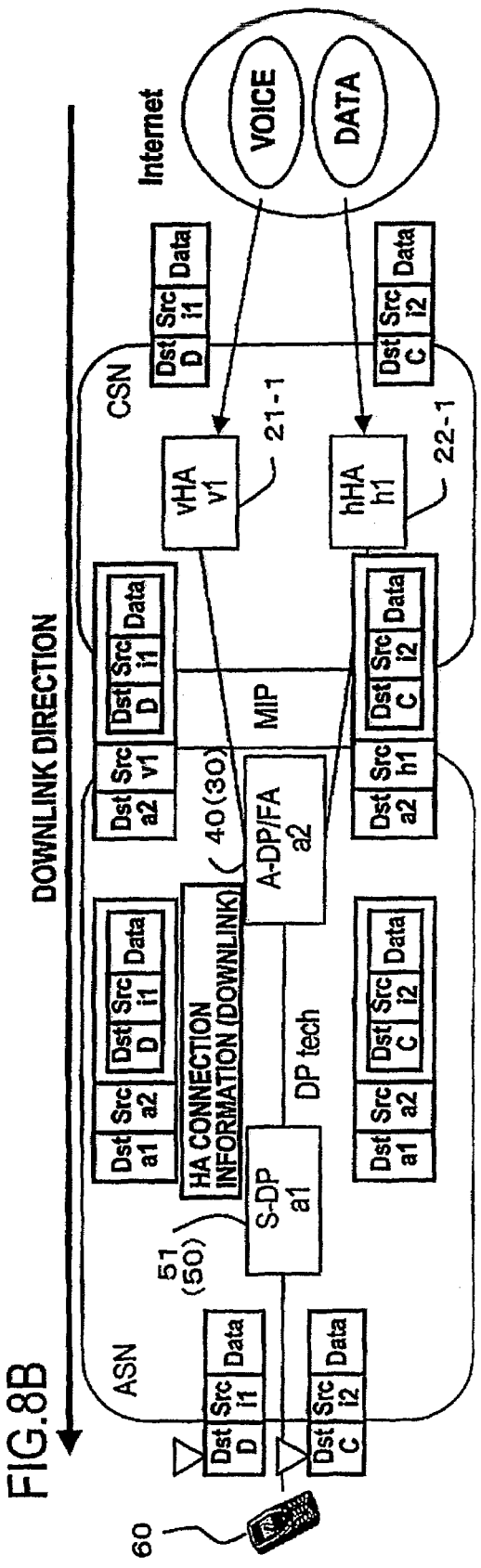

COMMUNICATION METHOD AND GATEWAY APPARATUS

CROSS-REFERENCE TO RELATED APPLICATION

This application is based upon and claims the benefit of priority of the prior Japanese Patent Application No. 2008-189833, filed on Jul. 23, 2008, the entire contents of which are incorporated herein by reference.

FIELD

The present invention relates to a communication method and a gateway apparatus.

BACKGROUND

A WiMAX system is predicated on application of the IP protocol to a network, and combines L3 mobility technology based on mobile IP with L2 mobility technology based on the IEEE 802.16e standard to realize mobile services (see for example the "WiMAX Forum Network Specification").

FIG. 12 illustrates an example of the network configuration of a WiMAX system 1. The WiMAX system 1 comprises a CSN (Core Service Network) 20, an ASN (Access Service Network) 25, and a MS (Mobile Station) 60.

The CSN 20 comprises HAs (Home Agents), as well as AAA (Authentication, Authorization, and Accounting) servers, DHCP (Dynamic Host Configuration Protocol) servers, and similar.

The ASN 25 comprises the ASN-GWs (ASN-Gateways) 100-1, 100-02, and the BSes 50-1 to 50-4. The ASN-GWs 100-1 and 100-2 comprise FA (Foreign Agent), A-DP (Anchor-DP), and other functions.

FIG. 13 illustrates an example of the flow of packets when packets are transmitted from the opposing node CN 10. In the figure, the HA 21 and the FA/A-DP 140 are respectively comprised by the CSA 20 and the ASN-GW 100 in FIG. 1. Here, the IP address of the MS 60 is "m", the IP address of the FA 140 is "A", and the IP address of the BS 50 is "B".

The HA 21 receives a packet with the destination "m" from the CN 10 via the Internet. The HA 21 references a management table and decides the transfer destination (the FA/A-DP 140 with address "A"). The HA 21 encapsulates the packet with address "m" in a packet with address "A", and transmits the packet to the FA/A-DP 140.

The FA/A-DP 140, upon receiving the packet with destination "A", decapsulates the packet, references a management table, and decides the transfer destination (the BS 50 with address "B"). The FA/A-DP 140 encapsulates the packet with destination "m" in a packet with destination "B", and transmits the packet to the BS 50.

The BS 50 decapsulates the packet with destination "B", and transmits the packet with destination "m" to the MS 60. And, the MS 60 receives the packet with destination "m".

Further, in WiMAX, similarly to other wireless technology, network operation through roaming is also defined, but the MS 60 can only register a single HA 21 (see for example the "WiMAX Forum Network Specification").

Hence when the MS 60 performs network communications while roaming, as illustrated in FIG. 14 and FIG. 15 the MS 60 performs network communication by choosing either to connect to an HA operated by another enterprise (in FIG. 14 and FIG. 15, a vHA (visited HA) 21-1), or be connecting to an HA operated by the contracting enterprise (in FIG. 14 and elsewhere, a hHA (home HA) 21-2).

SUMMARY

Hence one object of the invention is to provide a communication method, as well as a gateway apparatus, which prevent such declines in service quality.

A communication method and a gateway apparatus which prevent declines in service quality can be provided.

A communication method in a gateway apparatus has a transmission step of transmitting and receiving packets to and from a mobile station device, and transmitting and receiving packets to and from a home agent; and a setting step of establishing settings such that the packets from the mobile station device can be transmitted to at least a first and a second home agent, and the packets from at least the first and second home agents can be received.

A gateway apparatus has
a transmission unit, which transmits and receives packets to and from a mobile station device, and which transmits and receives packets to and from a home agent; and
a settings unit, which establishes settings such that the packets from the mobile station device can be transmitted to at least a first and a second home agent, and the packets from at least the first and second home agents can be received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates an example of HA connection information;

FIG. 4 illustrates an example of HA connection information;

FIG. 6 illustrates an example of processing to secure a communication path;

FIG. 7 illustrates an example of processing to secure a communication path;

FIG. 8A illustrates an example of packet processing, and FIG. 8B illustrates an example of packet processing;

DESCRIPTION OF EMBODIMENTS

Figure 1:
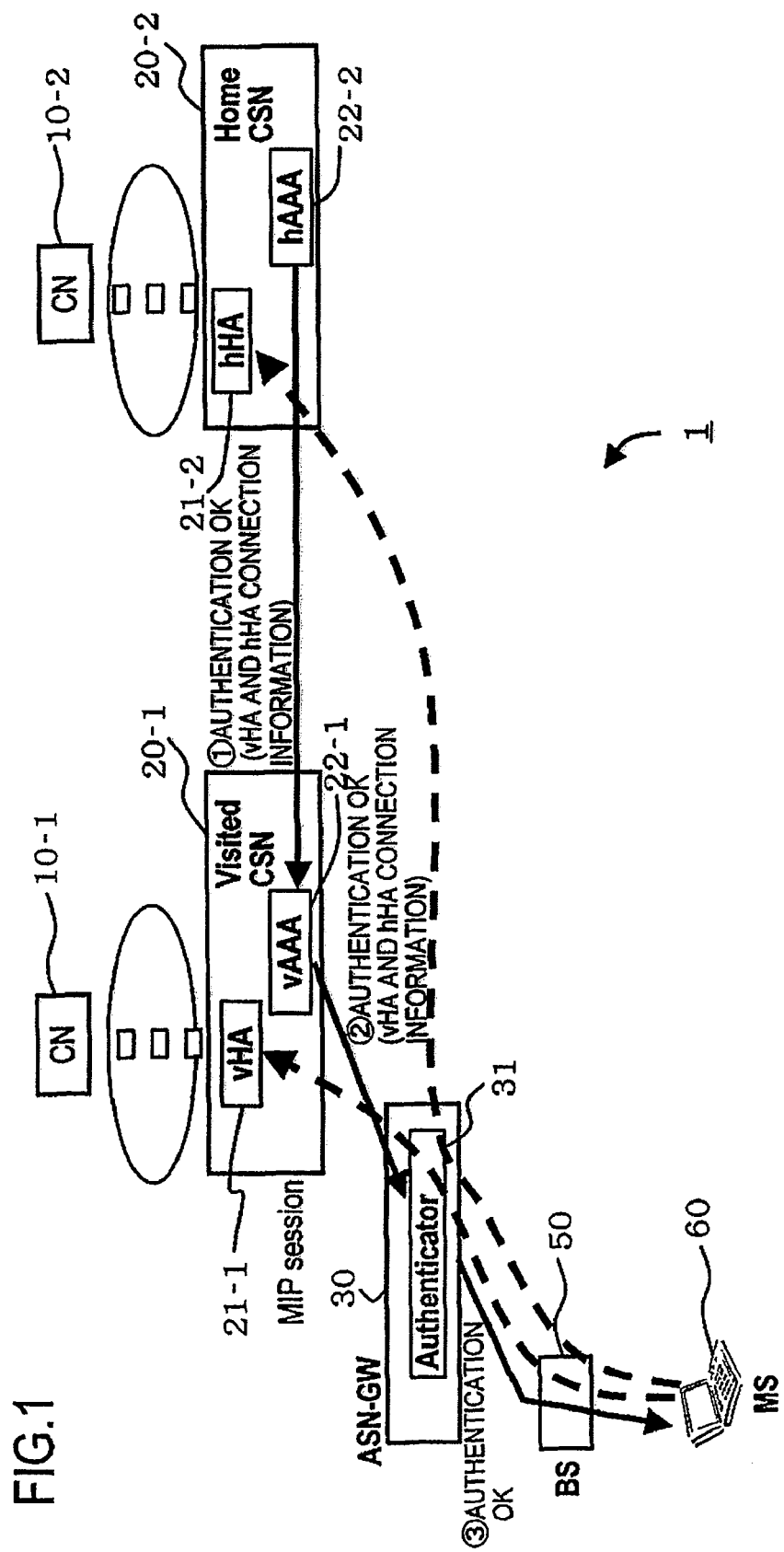
FIG. 1 illustrates an example of the network configuration of a WiMAX system.

When the MS 60 connects with an HA 21-1 or 21-2 of one of the enterprises, depending on the service, there may be services which cannot be received without connecting to the HA 21-2 operated by the contracting enterprise.

Further, when connecting to the HA 21-2 of the contracting enterprise via another enterprise, transfer packets are routed through the HA 21-1 of the other enterprise for transmission to the HA 21-2 of the contracting enterprise. Hence to this extent the number of transfers (number of hops) is increased, and delays occur. When providing highly interactive services involving voice, video and similar, such delays result in worsened service quality.

Below, preferred aspects for implementation are explained, referring to the drawings.

Figure 12:
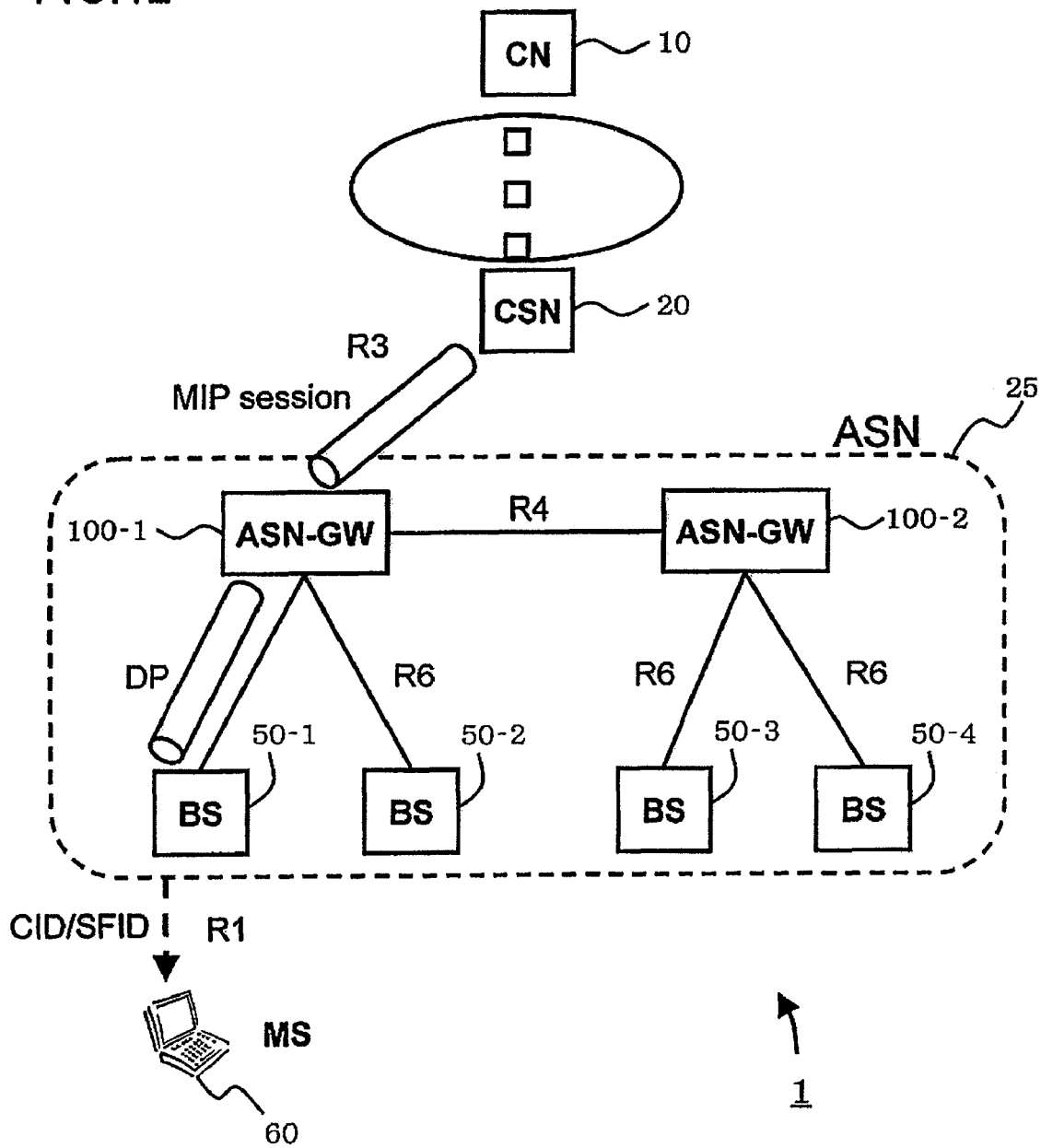
FIG. 12 illustrates an example of the network configuration of a WiMAX system.
Figure 13:
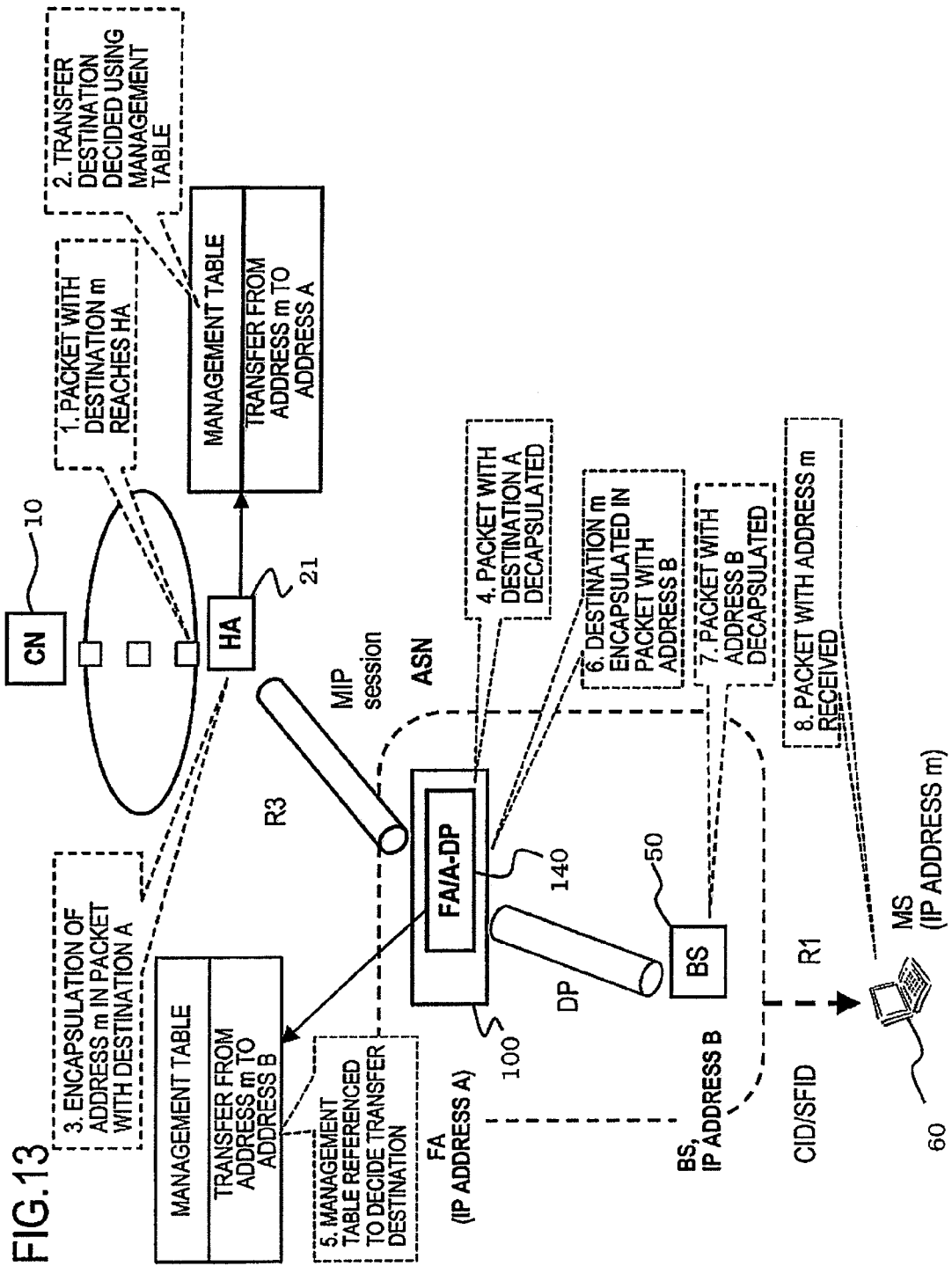
FIG. 13 illustrates a conventional example of packet processing.
Figure 14:
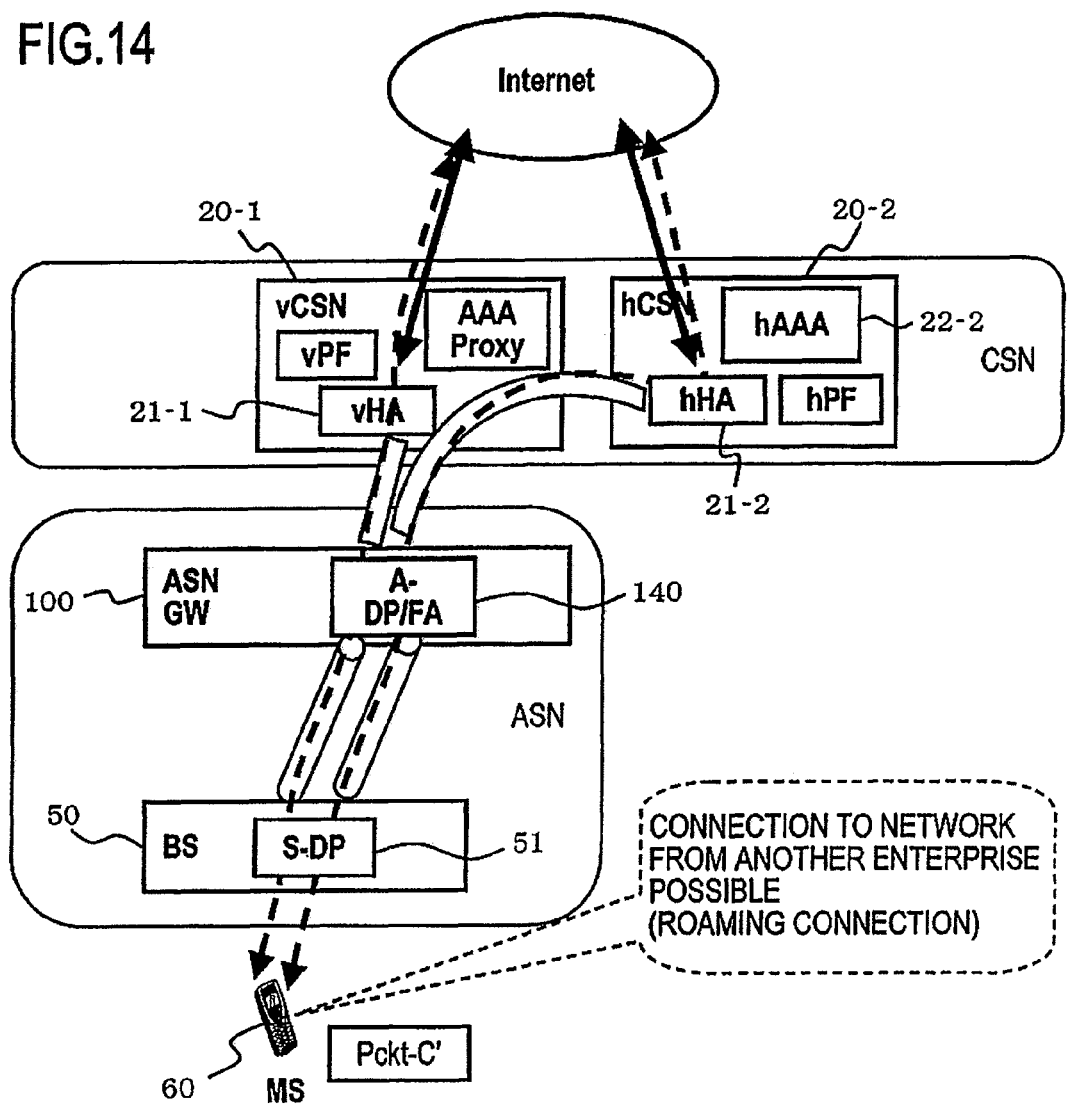
FIG. 14 illustrates an example of a conventional communication path.
Figure 15:
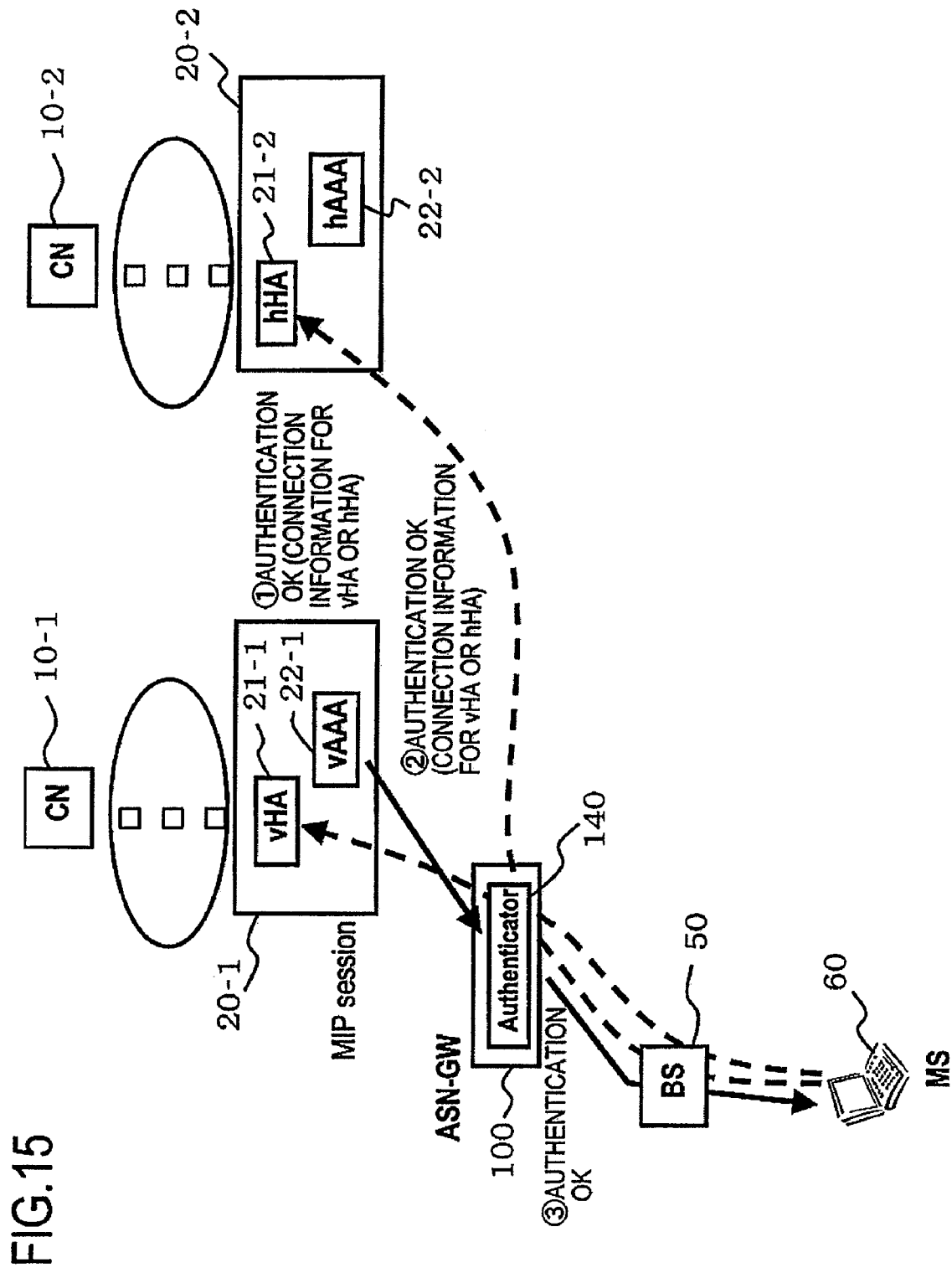
FIG. 15 illustrates an example of a conventional communication path.

The overall configuration of a WiMAX system 1 is similar to that in FIG. 12 explained above. FIG. 1 illustrates the configuration example of the WiMAX system 1 and the flow of packets and similar.

The WiMAX system 1 illustrated in FIG. 1 comprises two CNs 10-1 and 10-2, a visited CSN 20-1, a home CSN 20-2, an ASN-GW 30, a BS 50, and an MS 60.

Here, the visited CSN 20-1 and home CSN 20-2 are comprised by the CSN 20 of FIG. 12, and the ASN-GW 30 and BS 50 are comprised by the ASN 25.

The visited CSN 20-1 is the CSN which is visited (the movement destination) of the MS 60, and is for example a CSN of another enterprise different from the contracting enterprise of the MS 60. The visited CSN 20-1 comprises the vHA (visited HA21-1) and the vAAA (visited AAA) 22-1.

The vHA 21-1 manages the addresses of FAs (ASN-GW 30) and similar in the visited CSN. The vAAA 22-1 executes control to collect authentication, permission, billing, and other information for an MS 60 in the visited CSN.

The home CSN 20-2 is the CSN registered as the home network by the MS 60, and is for example the CSN managed by the contracting enterprise of the MS 60. The home CSN 20-2 comprises an hHA (home HA) 21-2 and an hAAA (home AAA) 22-2.

The hHA 21-2 manages the addresses of FAs (ASN-GW 30) and similar in the home CSN 20-2. The hAAA 22-2 executes, in the home CSN 20-2, control to collect authentication and other information for the MS 60.

ASN-GW 30 is a gateway apparatus, and comprises the functions of an A-DP and an FA as well as comprising an authenticator 31 which performs authentication management.

BS 50 is a base station device, which converts packets from the ASN-GW 30 into wireless signals which are transmitted to the MS 60, and converts wireless signals from the MS 60 into packets which are output to the ASN-GW 30.

MS 60 is a mobile station (or terminal) device, which receives and requests services by exchanging wireless signals with the BS 50.

The example illustrated in FIG. 1 illustrates a state in which the MS 60 is subordinate to the visited BS 50 as a result of a handover or similar, and attempts to connect with the visited CSN 20-1.

At this time, the MS 60 requests authentication. When transmitting an authentication permission message, the hAAA 22-2 transmits the message with hHA 21-2 connection information. The vAAA 22-1 also appends vHA 21-1 connection information to the authentication permission message. The vAAA 22-1 transmits connection information for two HAs (hHA 21-2 and vHA 21-1) to the ASN-GW 30.

Based on connection information for the two HAs (hereafter "HA connection information"), the ASN-GW 30 transmits data packets which for example are highly interactive, such as audio and video, to the vHA 21-1, and transmits packets with low interactivity such as e-mail to the hHA 21-2.

Figure 2:
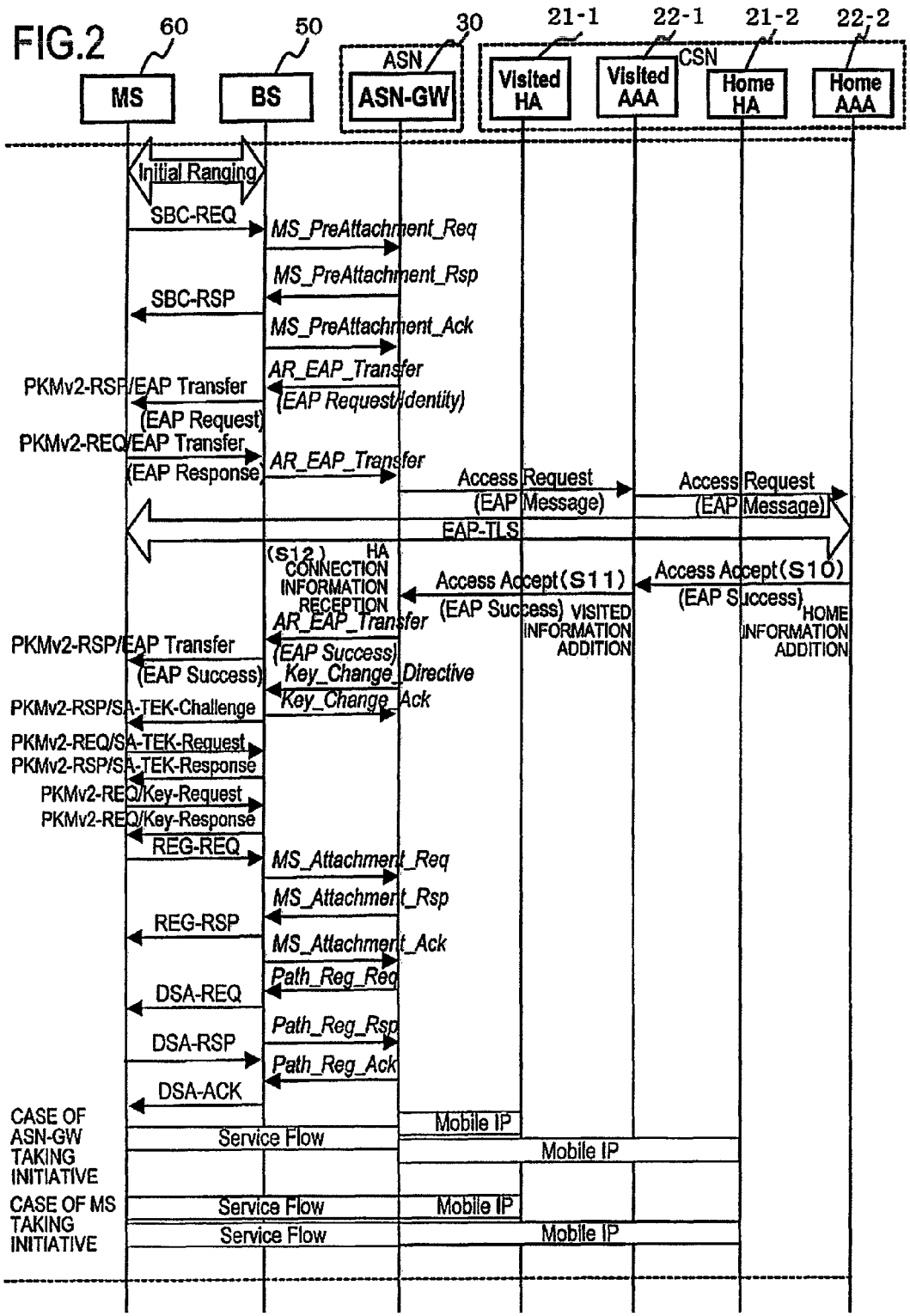
FIG. 2 illustrates an example of an initial network registration sequence.

In this embodiment, the HA connection information is transmitted at the time of authentication of the MS 60. FIG. 2 illustrates an example of an initial network registration sequence.

As illustrated in the figure, after each of the sequences for initial ranging and for basic function checks (SBC-REQ to SBC-RSP), a terminal authentication sequence is performed (PKM). Then, the hAAA 22-2 appends hHA 21-2 connection information when transmitting an Access Accept indicating terminal authentication permission, and transmits to the vAAA 22-1 (S10), and the vAAA 22-1 further appends vHA 21-1 connection information and transmits (S11). The ASN-GW 30 receives the HA connection information (S12).

FIG. 3 and FIG. 4 illustrate examples of HA connection information. The presence of two types of HA connection information 311, 312 is due to the fact that in this embodiment there are two cases, one in which the MS 60 takes the initiative, and one in which the ASN-GW 30 takes the initiative.

That is, in the case in which the MS 60 takes the initiative, each AAA (the hAAA 22-2 and the vAAA22-1) notifies the MS 60 of two HoA (home addresses) when providing notification of the HA connection information 311. And, the MS 60 uses the two HoAs selectively according to the service.

For example, when receiving highly interactive voice services, the MS 60 uses the HoA to connect to the vHA 21-1 (in the example of FIG. 3, "10.10.10.111"), and at other times uses the HoA to connect to the hHA 21-2 (in the example of FIG. 3, "11.10.10.15"). The ASN-GW 30 holds the HA connection information 311, and by comparing the transmission source addresses of packets from the MS 60 and the transmission source addresses of the connection information 311, transmits the packets to the vHA 21-1 or to the hHA 21-2.

On the other hand, in the case in which the ASN-GW 30 takes the initiative, when each AAA gives notification of the HA connection information 312, one HoA is provided (in the example of FIG. 4, "10.10.10.111"). The MS 60 uses this HoA. Upon receiving an IP packet from the MS 60, the ASN-GW 30 extracts the service class ("DSCP") assigned to the packet, references the HA connection information 312, and transmits the packet to the vHA 21-1 or to the hHA 21-2.

For example, based on the HA connection information 312, the ASN-GW 30 transmits voice data with high interactivity (in the example of FIG. 4, the DSCP "010010" indicates a voice data class) to the vHA 21-1, and transmits other packets (in the example of FIG. 4, "not 010010") to the hHA 21-2.

The HA connection information 311 and 312 both are information used in judgment in the ASN-GW 30 as to the service type and whether the interactivity is high or not, and the packet assignment destination (HA) is decided according to the result.

Figure 5:
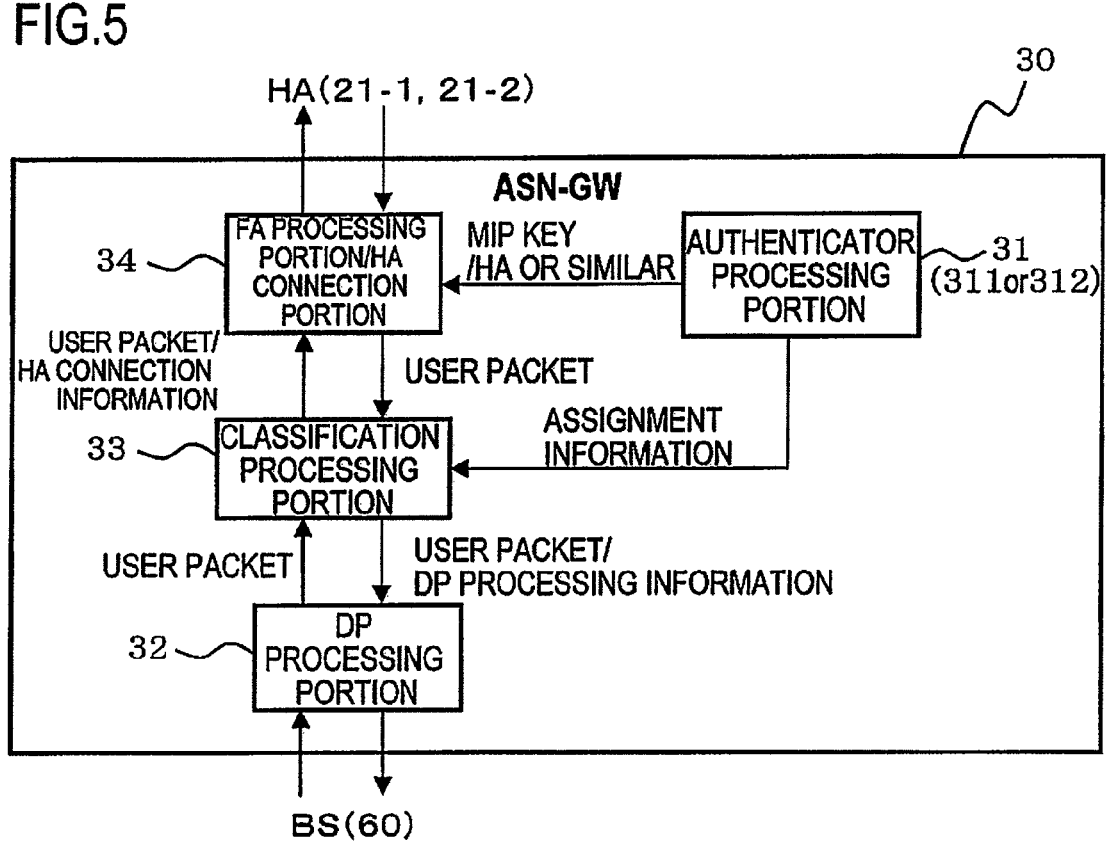
FIG. 5 illustrates an example an ASN-GW configuration.

Next, the configuration of the ASN-GW 30 which decides packet assignment destinations is explained. FIG. 5 illustrates an example of such a configuration.

The ASN-GW 30 comprises an authenticator processing portion 31, a DP (Data Path) processing portion 32, a classification processing portion 33, and a FA processing portion/HA connection processing portion 34.

The authenticator processing portion 31 holds HA connection information 311, 312 and similar, and distributes assignment information and other information.

The DP processing portion 32 sets the data path with the BS 50, and performs processing for user packet transmission/reception with the BS 50 and similar.

Based on assignment information from the authenticator processing portion 31, the classification processing portion 33 decides the assignment destinations (hHA 21-2 or vHA 21-1) of user packets.

The FA processing portion/HA connection processing portion 34 performs IP processing and similar of user packets, and transmits the user packets (IP packets) to the hHA 21-2 or to the vHA 21-1.

Next, operation to obtain or secure a communication path is explained. As described above, there are two cases, one in which the MS 60 takes the initiative (two HoAs) and one in which the ASN-GW 30 takes the initiative (one HoA), and so each is explained.

FIG. 6 illustrates the case in which the MS 60 takes the initiative, and FIG. 7 illustrates the case in which the ASN-GW 30 takes the initiative; both illustrate operations after the end of the initial network registration processing of FIG. 2. It is assumed that the ASN-GW 30 holds HA connection information, and that the MS 60 has been notified of the HoA.

First, in FIG. 6, the ASN-GW 30 (DP processing portion 32) sets data paths for connection of the MS 60 to the two HAs (vHA 21-1 and hHA 21-2).

After setting the two data paths, the MS 60 executes MIP registration with the two HAs from the two data paths.

Upon receiving MIP registration from the MS 60, the vHA 21-1 and hHA 21-2 judge whether the MIP registration is valid. At this time, the vHA 21-1 and hHA 21-2 have already transmitted authentication permission to the MS 60 (S10 and S11 in FIG. 2), and so MIP registration is permitted. Then, packet communication paths from the MS 60 to the vHA 21-1 and hHA 21-2 are secured. Thereafter the MS 60 initiates packet transmission and reception. Packet processing after initiation of communication is described below.

On the other hand, FIG. 7 is an example of the case in which the ASN-GW 30 takes the initiative. The ASN-GW 30 (DP processing portion 32) sets a data path with the BS 50. In this case the data path is a data path enabling connection to only one HA (vHA 21-1 or hHA 21-2).

Next, the MS 60 executes MIP registration of one HA (the vHA 21-1 or hHA 21-2).

Upon receiving the MIP registration from the MS 60, the vHA 21-1 or hHA 21-2, having already transmitted authentication permission to the MS 60, permits MIP registration and transmits a message to this effect to the MS 60. And, a communication path from the MS 60 to the HA (vHA 21-1 or hHA 21-2) is secured.

Next, the ASN-GW 30 (for example, the FA processing portion/HA connection processing portion 34) executes MIP registration with the other HA (hHA 21-2 or vHA 21-1).

Upon receiving the MIP registration, the other HA judges whether the MIP registration by the ASN-GW 30 is valid for the vAAA 22-1 or hAAA 22-2. Because the ASN-GW 30 has already permitted connection to the hHA 21-2 or vHA 21-1 (S10, S11 in FIG. 2), MIP registration is permitted for the vAAA 22-1 or hAAA 22-2. Then, packet communication paths from the MS 60 to the two HAs are secured. Thereafter the MS 60 initiates packet transmission and reception.

Figure 9A:
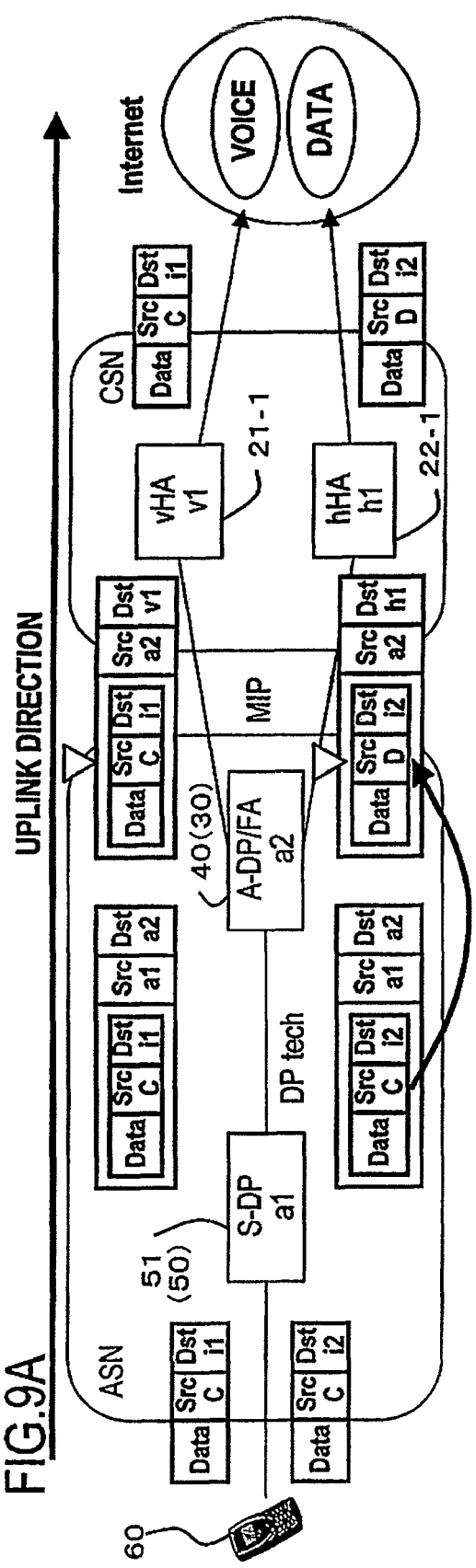
FIG. 9A illustrates an example of packet processing.
Figure 9B:
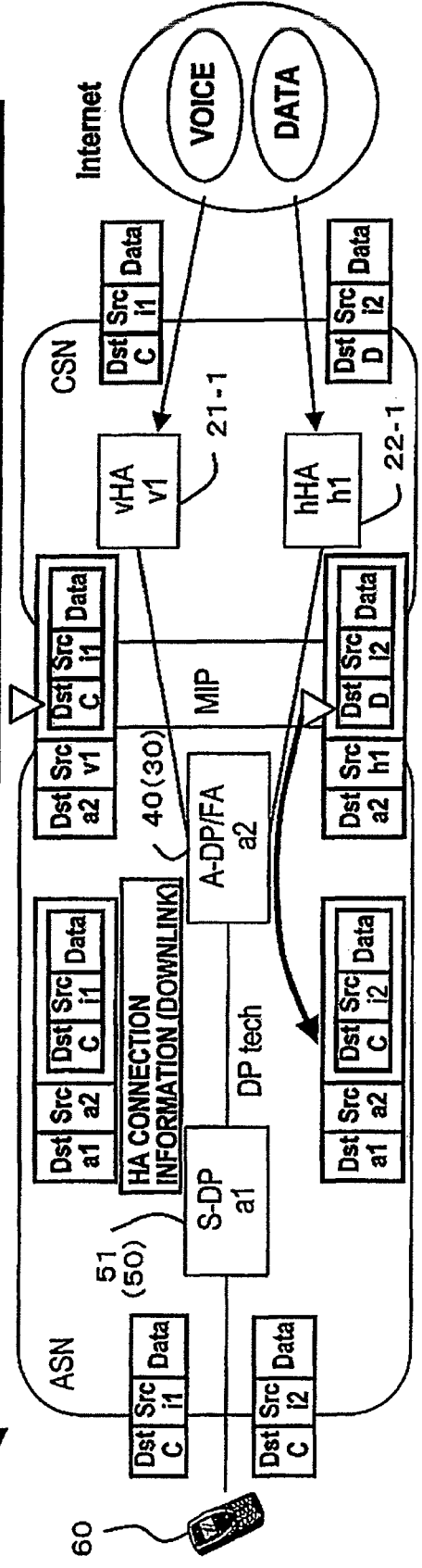
FIG. 9B illustrates an example of packet processing.

Next, packet processing is explained for the two cases. FIG. 8A and FIG. 8B illustrate an example of packet processing for a case in which the MS 60 takes the initiative (with two HoAs), and FIG. 9A and FIG. 9B illustrate an example of packet processing for a case in which the ASN-GW 30 takes the initiative (with one HoA).

FIG. 8A illustrates an example of packet processing in the uplink direction when the MS 60 takes the initiative.

The MS 60 transmits packets by means of the two HoAs, using an address "D" (in the example of FIG. 3, "10.10.10.111") for a highly interactive surface, and using an address "C" (in the example of FIG. 3, "10.10.10.15") for a service with low interactivity.

Upon receiving a packet from the MS 60, the BS 50 (S-DP 51 (Serving Data Path)) performs encapsulation, and transmits the packet, with its own address "a1" as the transmission source and the address "a2" of the ASN-GW 30 (A-DP/FA 40) as the transmission destination.

Upon receiving this packet, the ASN-GW 30 performs decapsulation, and creates a packet which has the address "v1" of the vHA 21-1 as the transmission destination when the transmission source address of the packet comprised by the data area is "D", but has the address "h1" of the hHA 21-2 as the transmission destination when the transmission source address is "C", and transmits the packet to vHA 21-1 or to hHA 21-2 respectively.

The vHA 21-1 and hHA 21-2 decapsulate received packets, and transmit packets transmitted from the MS 60 to the CN 10 via the Internet.

FIG. 8B illustrates an example of packet processing in the downlink direction, for the case in which the MS 60 takes the initiative.

The vHA 21-1 and hHA 21-2 each receives from the CN 10 a packet addressed to the MS 60 (packets with address "D" and address "C"). The vHA 21-1 and hHA 21-2 encapsulate these packets, reference a management table which for example was created at the time of network entry (for example FIG. 2), and transmit the packets to the ASN-GW 30 (A-DP/FA 40).

The ASN-GW 30 (for example, the FA processing portion/HA connection processing portion 34) decapsulates the packets. The ASN-GW 30 (for example, the DP processing portion 32) then transmits the decapsulated packets to the BS 50 (S-DP 51).

The BS 50 decapsulates packets from the ASN-GW 30, extracts packets comprised by the data area, and transmits the packets to the MS 60. The MS 60 receives two types of packets, having two HoAs as the transmission destinations (address "D" and address "C").

FIG. 9A illustrates an example of packet processing in the uplink direction, for the case in which the ASN-GW 30 takes the initiative.

The MS 60 transmits one packet with address "C" as the transmission source to the BS 50 (S-DP 51).

The BS 50 encapsulates the received packet. The transmission source of the encapsulated packet is the BS 50 (address "a1"), and the transmission destination is the ASN-GW 30 (A-DP/FA 40) (address "a2").

Upon receiving the packet from the BS 50, the ASN-GW 30 decapsulates the packet and extracts the packet transmitted by the MS 60. At this time, the ASN-GW 30 reads assignment information from the HS connection information 312 and decides on the HA assignment destination. For example, the ASN-GW 30 reads the HA assignment information corresponding to the glass of the packet transmitted by the MS 60 ("DSCP" in FIG. 4) (when the DSCP is "010010" (voice), the HA is the vHA 21-1, and otherwise is the hHA 21-2), and decides the HA assignment.

When the assignment destination HA is the hHA 21-2 (or the vHA 21-1), the ASN-GW 30 converts the transmission source address of the packet transmitted by the MS 60 (in the example of FIG. 9A, converts the address into address "D"). Thas is, the ASN-GW 30 performs processing of the source address of the MS 60 assigned in advance by the vAAA 22-1 or hAAA 22-2, and transmits the packet to the assignment destination HA.

The ASN-GW 30 encapsulates a packet with the transmission source address converted or a packet with the transmission source address unconverted, and transmits the packet to the vHA 21-1 or the hHA 21-2. In the example of FIG. 9A, the ASN-GW 30 transmits a packet with an unconverted MS 60 transmission source address to the vHA 21-1, and transmits a packet with a converted transmission source address to the hHA 21-2.

The vHA 21-1 or hHA 21-2 decapsulates a packet received from the ASN-GW 30, and transmits the result to the Internet.

FIG. 9B illustrates an example of packet processing in the downlink direction, for the case in which the ASN-GW 30 takes the initiative.

The vHA 21-1 and hHA 21-2 each receive a packet from the Internet addressed to the MS 60. The vHA 21-1 and hHA 21-2 receive packets, each of which has a different transmission destination for the MS 60. In the example of FIG. 9B, the vHA 21-1 receives a packet the transmission destination address of which is "C", and the hHA 21-2 receives a packet with a transmission destination address of "D". Transmission source addresses for the MS 60 differ because of processing of the MS 60 addresses assigned by vAAA 22-1 and hAAA 22-2 in the vHA 21-1 and in the hHA 21-2, as described above.

Upon receiving the packets from the Internet, the vHA 21-1 and hHA 21-2 encapsulate the packets and transmit the packets to the ASN-GW 30 (A-DP/FA 40).

The ASN-GW 30 decapsulates the packets, and based on the HA connection information 312, confirms that the packets are addressed to the MS 60.

In the example illustrated in FIG. 9B, the classification processing portion 33 converts the transmission source address of the packet from the hHA 21-2 from "D" to "C".

The ASN-GW 30 encapsulates the packet with transmission destination address converted and the packet with transmission destination address unconverted, and transmits the results to the BS 50 (S-DP 51).

The BS 50 decapsulates packets from the ASN-GW 30, and transmits the results to the MS 60.

Figure 10:
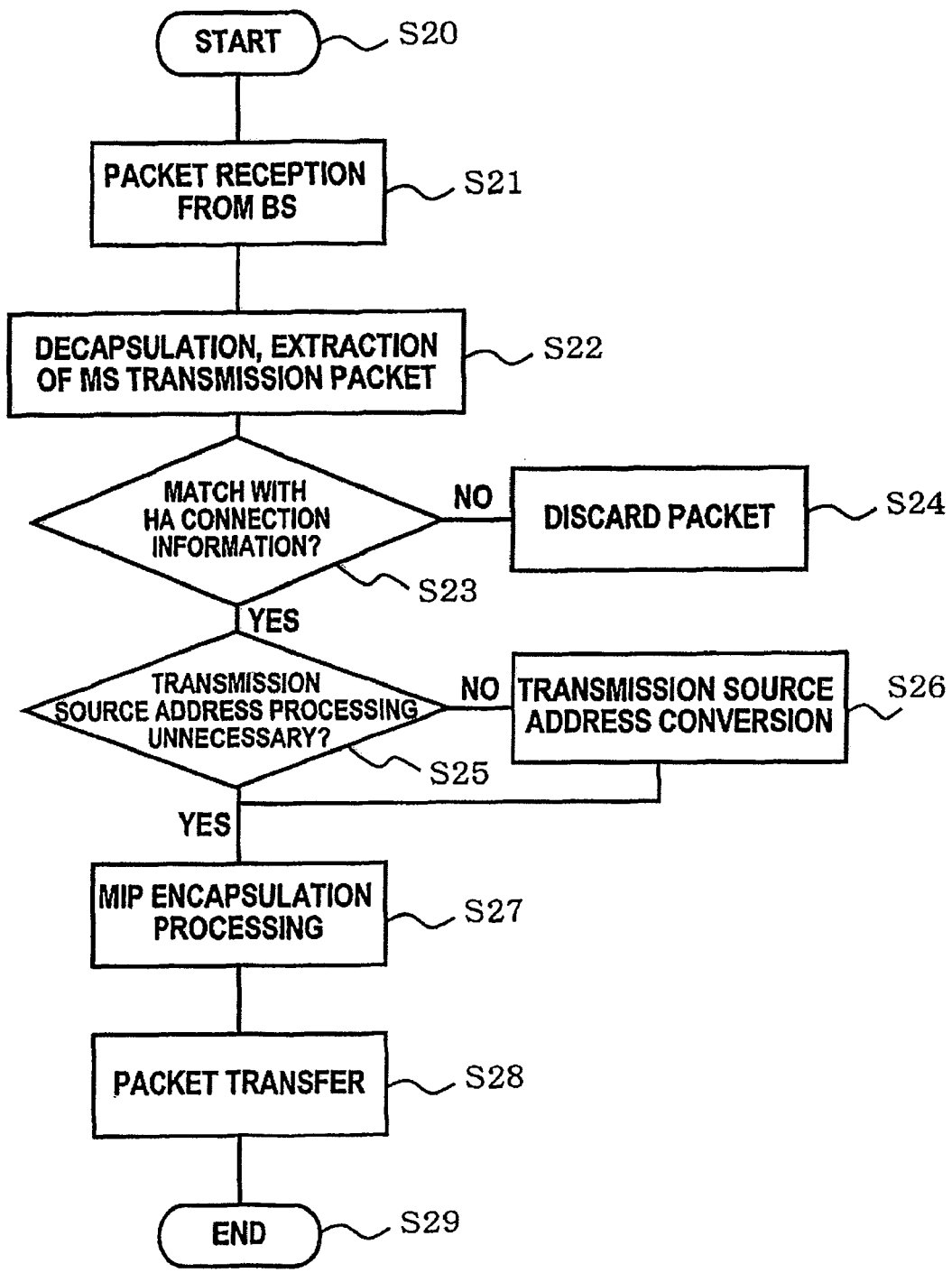
FIG. 10 is a flowchart illustrating an example of packet processing.
Figure 11:
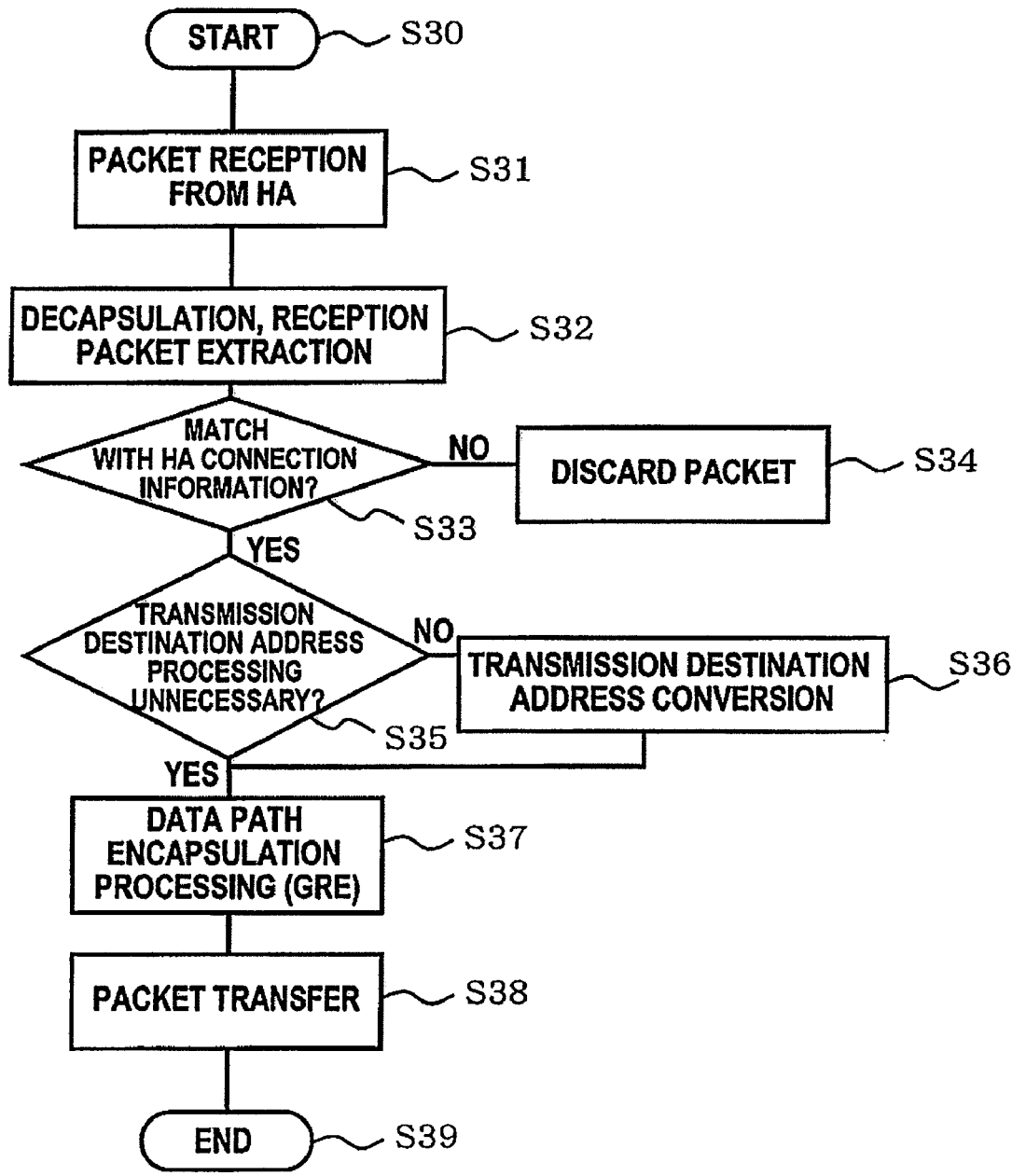
FIG. 11 is a flowchart illustrating an example of packet processing.

FIG. 10 and FIG. 11 are flowcharts illustrating examples of processing executed by the ASN-GW 30, and illustrate examples of processing in the uplink direction and in the downlink direction respectively.

In the uplink direction case illustrated in FIG. 10, when the ASN-GW 30 initiates processing (S20), a packet is received from the BS 50 (S21).

The DP processing portion 32 decapsulates the received packet and extracts the transmission packet transmitted from the MS 60 (S22).

The classification processing portion 33 judges whether the transmission source address of the transmission packet extracted by the DP processing portion 32 matches a transmission source address in the HA connection information 311, 312 (S23).

In the classification processing portion 33, if the transmission source address of the extracted transmission packet does not match an uplink-direction transmission source address of the HA connection information 311, 312 ("No" in S23), the transmission packet is discarded (S24).

If on the other hand the transmission source address of the extracted transmission packet matches an uplink-direction transmission source address of the HA connection information 311, 312 ("Yes" in S23), the classification processing portion 33 decides the assignment destination of the transmission packet, and judges whether transmission source address processing is necessary (S25).

The assignment destination of the transmission packet is decided for example as follows. The classification processing portion 33 accesses the connection information 311, 312 held by the authenticator processing portion 31, and reads connection HAs as assignment information.

For example, when the MS 60 has taken the initiative, because two addresses are allocated to the MS 60, the connection HA corresponding to the transmission source address of the extracted packet is simply read from the HA connection information 311.

And, when the ASN-GW 30 has taken the initiative, the class information (DSCP) indicating the packet type is read from the extracted packet, and the connection HA corresponding thereto may then be read from the HA connection information 312. For example, in the case of a packet for a highly interactive service as described above, the connection HA is vHA 21-1, and for other packets the connection HA is hHA 21-2.

The judgment as to whether transmission source address processing is necessary is for example performed as follows. In a case in which the MS has taken the initiative in the HA connection information 311, 312, the classification processing portion 33 judges that uplink direction transmission source address processing is unnecessary ("Yes" in S25).

On the other hand, in a case in which the ASN-GW has taken the initiative in the HA connection information 311, 312, the classification processing portion 33 judges that uplink direction transmission source address processing is necessary. In this case, however, when the packet has a transmission source address which is the same as the uplink direction transmission source address, transmission source address processing is judged to be unnecessary ("Yes" in S25). And, when the transmission source address is different from the address, transmission source address processing is judged to be necessary ("No" in S25).

Upon judging that transmission source address processing is necessary ("No" in S25), the classification processing portion 33 converts the transmission source address (S26).

Next, the FA processing portion/HA connection processing portion 34 encapsulates a packet the transmission source address of which has been converted, or has not been converted (S27), and transfers the packet to the relevant HA (S28). And, the ASN-GW 30 ends the series of processing (S29).

In the case of the downlink direction illustrated in FIG. 11, the ASN-GW 30 initiates processing (S30) and receives a packet from an HA (S31).

Next, the FA processing portion/HA connection processing portion 34 decapsulates the received packet and extracts the reception packet (S32).

Next, the classification processing portion 33 judges whether the transmission source address of the reception packet matches a downlink-direction "transmission source address" in the HA connection information 311, 312 (S33).

When there is no match ("No" in S33), the classification processing portion 33 discards the reception packet (S34).

On the other hand, when there is a match ("Yes" in S33), the classification processing portion 33 judges whether transmission destination address processing is necessary (S35).

Judgment of whether transmission destination address processing is necessary is for example performed as follows. The classification processing portion 33 accesses the HA connection information 311, 312 held in the authenticator processing portion 31, and when two uplink-direction transmission source addresses are entered in the HA connection information 311, 312 (case in which the initiative is taken by the MS), it is judged that address conversion is not necessary ("Yes" in S35).

When there is only one uplink-direction transmission source address entered in the HA connection information 311, 312 (case in which the initiative is taken by the ASN-GW 30), when the transmission destination address of the packet is the uplink-direction transmission source address, the classification processing portion 33 judges that address conversion is not necessary ("Yes" in S35).

On the other hand, when the transmission destination address of the packet does not match the uplink-direction transmission source address, the classification processing portion 33 judges that address conversion is necessary ("No" in S35). In this case, the classification processing portion 33 converts the transmission destination address (S36).

Next, the DP processing portion 32 encapsulates the packet with the transmission destination address converted or not converted (S37), and transmits the packet to the MS 60 (S38).

Then, the ASN-GW 30 ends the series of processing (S39).

Thus in this embodiment, the ASN-GW 30 holds information for connection to a plurality of HAs during MS 60 authentication processing, and assigns and transmits transmission packets from the MS 60 to the HAs according to the service type. Hence compared with a case in which packets are transmitted to only one HA, a decline in service quality can be prevented.

The above-described example explained a case of connection to two HAs. Connection to three or more HAs can be performed similarly to the above-described example. For example, information for connection to three or more HAs is registered in the HA connection information 311, 312.

Further, in the above-described example the packet assignment destination is judged from the transmission source addresses of the HA connection information 311, 312 and the DSCP. For example, in the HA connection information 311, 312, the assignment destination may be decided using the "Protocol" information indicating the communication protocol, such as ftp or TCP, and the "Port" information indicating port numbers. In this case also, protocols corresponding to highly interactive services employ connection to vHA 21-1, and protocols corresponding to other services can employ connection to hHA 21-2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication method in a gateway apparatus comprising:
    transmitting and receiving packets to and from a mobile station device, and transmitting and receiving packets to and from a home agent; and
    establishing settings such that the packets from the mobile station device can be transmitted to at least a first and a second home agent, and the packets from at least the first and second home agents can be received,
    wherein the transmitting includes transmitting the packet transmitted from the mobile station device to the first home agent when a service type of the packet transmitted from the mobile station device requires real-time communication, and transmitting the packet transmitted from the mobile station device to the second home agent when the service type does not require real-time communication,
    wherein the second home agent is a home agent of a contracting enterprise which has entered into a contract regarding the mobile station device, and the first home agent is a home agent of another enterprise different from the contracting enterprise.

2. The communication method according to claim 1, wherein the establishing settings is performed at the time of authentication processing of the mobile station device.

3. The communication method according to claim 1, wherein the establishing settings is performed based on connection information received from an authentication server.

4. A communication method in a gateway apparatus comprising:
    transmitting and receiving packets to and from a mobile station device, and transmitting and receiving packets to and from a home agent; and
    establishing settings such that the packets from the mobile station device can be transmitted to at least a first and a second home agent, and the packets from at least the first and second home agents can be received,
    wherein in said transmitting to the mobile station device or the home agent, when the packet having, as a transmission source address, a first and second address corresponding respectively to the first and second home agents is received from the mobile station device, based on the first or second address, the received packet is transmitted to the first or second home agent, and
    when the packet having, as a transmission destination address, the first and second address corresponding respectively to the first and second home agents is received from the first and second home agents, based on the first or second address, the received packet is transmitted to the mobile station device.

5. A communication method in a gateway apparatus comprising:
    transmitting and receiving packets to and from a mobile station device, and transmitting and receiving packets to and from a home agent; and
    establishing settings such that the packets from the mobile station device can be transmitted to at least a first and a second home agent, and the packets from at least the first and second home agents can be received,
    wherein in said transmitting to the home agent, when the packet having, as a transmission source address, a first address is received from the mobile station device, the transmission source address of the packet to be transmitted to the second home agent is converted from the first address into a second address, and the packet with the converted second address is transmitted to the second home agent.

6. A communication method in a gateway apparatus comprising:
    transmitting and receiving packets to and from a mobile station device, and transmitting and receiving packets to and from a home agent; and
    establishing settings such that the packets from the mobile station device can be transmitted to at least a first and a second home agent, and the packets from at least the first and second home agents can be received,
    wherein in said transmitting to the mobile station device, when the packets having, as a transmission destination address, a first and second address are respectively received from the first and second home agents, the transmission destination address of the packet from the second home agent is changed from the second address to the first address.

7. A gateway apparatus comprising;
a transmitting and receiving unit, which transmits and receives packets to and from a mobile station device, and which transmits and receives packets to and from a home agent; and
a settings unit, which establishes settings such that the packets from the mobile station device can be transmitted to at least a first and a second home agent, and the packets from at least the first and second home agents can be received,
wherein the transmitting and receiving unit transmits the packet transmitted from the mobile station device to the first home agent when a service type of the packet transmitted from the mobile station device requires real-time communication, and transmits the packet transmitted from the mobile station device to the second home agent when the service type does not require real-time communication,
wherein the second home agent is a home agent of a contracting enterprise which has entered into a contract regarding the mobile station device, and the first home agent is a home agent of another enterprise different from the contracting enterprise.

8. The gateway apparatus according to claim 7, wherein the settings unit establishes the settings at the time of authentication processing of the mobile station device.

9. A gateway apparatus comprising:
a transmitting and receiving unit, which transmits and receives packets to and from a mobile station device, and which transmits and receives packets to and from a home agent and
a settings unit, which establishes settings such that the packets from the mobile station device can be transmitted to at least a first and a second home agent, and the packets from at least the first and second home agents can be received,
wherein said transmitting and receiving unit, upon receiving the packet having, as a transmission source address, a first and second address corresponding respectively to the first and second home agents from the mobile station device, based on the first or second address, transmits the received packet to the first or second home agent,
upon receiving the packet having, as a transmission destination address, a first and second address corresponding respectively to the first and second home agents from the first and second home agents, based on the first or second address, transmits the received packet to the mobile station device.

10. A gateway apparatus comprising:
a transmitting and receiving unit, which transmits and receives packets to and from a mobile station device, and which transmits and receives packets to and from a home agent and
a settings unit, which establishes settings such that the packets from the mobile station device can be transmitted to at least a first and a second home agent, and the packets from at least the first and second home agents can be received,
wherein said transmitting and receiving unit, upon receiving the packet having, as a transmission source address, a first address from the mobile station device, converts the transmission source address of the packet to be transmitted to the second home agent from the first address into a second address, and transmits the packet with the converted second address to the second home agent.

11. A gateway apparatus comprising:
a transmitting and receiving unit, which transmits and receives packets to and from a mobile station device, and which transmits and receives packets to and from a home agent and
a settings unit, which establishes settings such that the packets from the mobile station device can be transmitted to at least a first and a second home agent, and the packets from at least the first and second home agents can be received,
wherein said transmitting and receiving unit, upon receiving the packets having, as a transmission destination address, a first and second address respectively from the first and second home agents, changes the transmission destination address of the packet from the second home agent from the second address to the first address, and performs transmission.

* * * * *